United States Patent [19]

Machii et al.

[11] Patent Number: 5,253,175
[45] Date of Patent: Oct. 12, 1993

[54] METHOD FOR PRELIMINARILY PRINTING BLANK FOR TAPERED DRAW-FORMED BODY

[75] Inventors: Akihiko Machii, Yokohama; Masao Ishinabe, Atsugi, both of Japan

[73] Assignee: Toyo Seikan Kaisha Ltd., Tokyo, Japan

[21] Appl. No.: 580,995

[22] Filed: Sep. 12, 1990

[30] Foreign Application Priority Data

Sep. 12, 1989 [JP] Japan ................. 1-234696

[51] Int. Cl.⁵ ................. G06F 15/46; H04H 1/00
[52] U.S. Cl. ................. 364/468; 358/140; 428/577; 428/578
[58] Field of Search ............... 364/468; 101/38.1, 39, 101/40, 40.1, 35; 358/140, 256, 280, 400; 428/577, 578, 579, 580, 581, 583–585

[56] References Cited

U.S. PATENT DOCUMENTS

| 4,469,022 | 9/1984 | Meaor | 364/468 |
| 4,692,810 | 9/1987 | Machii et al. | 358/256 |
| 4,817,005 | 3/1989 | Kubota et al. | 364/468 |
| 4,845,635 | 7/1989 | Rosselli | 364/468 |
| 5,143,793 | 9/1992 | Masse et al. | 428/577 |

FOREIGN PATENT DOCUMENTS

0202928  11/1986  European Pat. Off. .
63-61658  3/1988  Japan .

Primary Examiner—Jerry Smith
Assistant Examiner—Thomas E. Brown
Attorney, Agent, or Firm—Sughrue, Mion, Zinn, Macpeak & Seas

[57] ABSTRACT

Disclosed is a method for preliminarily printing a blank for a tapered draw-formed body, which comprises transforming digital rectangular coordinates to annular coordinates so that the height of the rectangular coordinates is made to correspond to the height of a tapered plane on which the printed image is to be manifested and the change of the area of the tapered plane by a minute change of the height of the tapered plane is made equal to the change of the area of the annular plane. In this method, excessive flattening of the image in the lateral direction is prevented when the resulting preliminarily printed blank is draw-formed, and an image having a beautiful appearance and a high commercial value can be reproduced.

5 Claims, 10 Drawing Sheets

METHOD FOR PRELIMINARILY PRINTING BLANK FOR TAPERED DRAW-FORMED BODY

BACKGROUND OF THE INVENTION (1) Field of the Invention

The present invention relates to a method for preliminarily printing a blank for a tapered draw-formed body.

(2) Description of the Related Art

Draw-forming of a surface-treated steel sheet such as a tinplate or tin-free steel sheet or a metal sheet such as an aluminium sheet is widely adopted for the manufacture of a so-called seamless can (two-piece can) and a metal cap. Coating or printing of individual formed bodies after the forming operation requires a complicated operation, and therefore, coating or printing of a flat blank before the draw-forming is desirable.

In Japanese Examined Patent Publication No. 63-61658, we proposed a method for making a draw-formed body having a printed image on the side wall portion by draw-forming a preliminarily printed blank, wherein an image on an original to be printed is subjected to photoelectric scanning to convert the original image to a picture element signal on rectangular coordinates, the rectangular coordinates are transformed to an annular plane having an area almost equal to the area of the rectangle of the coordinates while increasing the number of picture elements in the circumferential direction and decreasing the number of picture elements in the radial direction, and when the number of picture elements is increased, new coordinates of the picture element present in a space between the transformed coordinates corresponding to adjacent picture elements of the rectangular coordinates are calculated, picture element signals on the transformed coordinates are read and inputted in a printing plate and the obtained printing plate is used for printing the blank.

According to this prior art technique, an image of a rectangular image can be reproduced finely and precisely by units of dots or picture elements on an annularly developed plane of a printing plate, and a printed image corresponding precisely to the image of the rectangular original can be advantageously formed on the circumferential side wall portion of the draw-formed body by using this printing plate. However, in the case where the draw-formed body is a tapered draw-formed body such as a vessel for filling jelly or soft adzuki-bean jelly, the reproduced image is flattened in the lateral direction at an upper part, and the method is still insufficient in the faithful reproduction of the original image.

Namely, in the side face portion of a draw-formed vessel having a tapered side wall, if the image is radially expanded from the lower part to the upper part at an angle corresponding to the tapering angle, comfortable vision and appearance are given to human eyes. However, according to the above-mentioned prior art technique, the degree of the upward expansion from the lower part exceeds the optimum range, a picture, photograph or letter pattern indicating the content is flattened in the lateral direction and the appearance and commercial value is degraded.

SUMMARY OF THE INVENTION

It is therefore a primary object of the present invention to provide a method for preliminarily printing a blank for a tapered draw-formed body, which gives a preliminarily printed blank having such characteristics that when the blank is draw-formed into a tapered side wall (frustoconical side wall), an image of an original is reproduced in the form easiest to see as an image of a tapered vessel barrel on the surface of the side wall.

Another object of the present invention is to provide a method for preliminarily printing a blank for a tapered draw-formed body, in which transformation of coordinates to an annular plane is carried out so that flattening deformation in the lateral direction, which is inevitably caused in the conventional method, can be prevented.

In accordance with the present invention, there is provided a method for preliminarily printing a blank for a tapered draw-formed body, which comprises converting an image on an original to be printed, to a picture element signal on digital rectangular coordinates corresponding to picture elements, transforming the rectangular coordinates to annular coordinates so that the height of the rectangular coordinates is made to correspond to the height of a tapered plane on which the printed image is to be manifested and the change of the area of the tapered plane by a minute change of the height of the tapered plane is made equal to the change of the area of the annular plane, photoelectrically making a printing plate based on picture element signals on the transformed coordinates, and printing the blank by using the obtained printing plate.

DETAILED DESCRIPTION OF THE INVENTION

The preliminary printing method of the present invention is in agreement with the conventional method in that an image on an original to be printed is converted to a picture element signal on corresponding digital rectangular coordinates, the rectangular coordinates are transformed to annular coordinates, a printing plate is photoelectrically made based on picture element signals on the transformed coordinates and this printing plate is used for printing a blank. However, the present invention is characterized in that at this transformation of the coordinates, the height of the tapered plane on which the printed image is to be manifested is made to correspond to the height of the rectangular coordinates and the transformation of the coordinates is carried out so that the change of the area of the tapered plane by a minute change of the height of the tapered plane is made equal to the change of the area of the annular plane.

Namely, according to the conventional method, rectangular coordinates of picture elements of an original are developed to an annular plane having an area substantially equal to the area of the rectangle to effect the transformation of the coordinates. In contrast, according to the present invention, by performing the transformation of coordinates so that the height of the tapered plane on which the printed image is to be manifested is made to correspond to the height of the rectangular coordinates and the change of the area of the tapered plane by a minute change of the tapered plane in the height direction is made equal to the change of the area of the annular plane, increase of the periphery owing to increase of the height of the tapered plane is compensated at the transformation of the coordinates, and excessive flattening of the image manifested in the lateral direction at the draw forming is prevented or controlled. As the result, the image of the original can be reproduced on the tapered side wall in the form easiest to see.

Furthermore, at an optional tapered plane, since the length of the marginal side or the diameter of the marginal side is a function of the height, the change of the area of the tapered plane owing to a minute change of the height of the tapered plane can be easily calculated if the height is specified.

Figure 1:
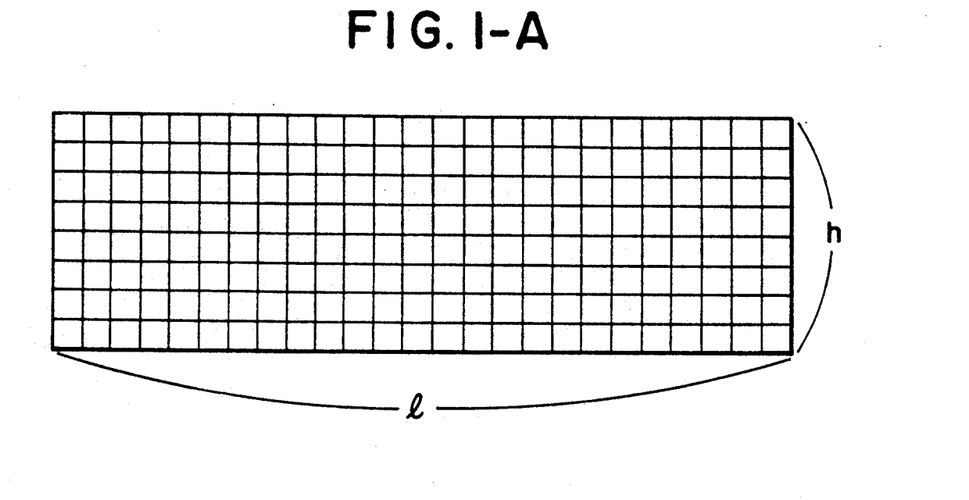
FIGS. 1A through 1C are diagrams illustrating the transformation of coordinates in the present invention.

Referring to FIGS. 1A through 1C illustrating the transformation of coordinates in the present invention, FIG. 1A shows rectangular coordinates corresponding to an original, FIG. 1B shows a tapered plane of a tapered body obtained by the draw forming, and FIG. 1C shows annular coordinates corresponding to a blank to be printed.

The rectangular coordinates have a length l and a height h (see FIG. 1A), and for convenience's sake, the tapered plane is regarded as an inverse frustoconical plane having a bottom radius $r_0$ and a height h (see FIG. 1B) and the annular coordinates are regarded as having a minimum radius $R_0$ (see FIG. 1C). Incidentally, $r_0$ is substantially equal to $R_0$ and the relation of $2\pi r_0 = l$ is established, and scanning in the direction X of the rectangular coordinates is synchronous with one cycle of scanning of each of the tapered plane and annular coordinates and scanning in the direction Y of the rectangular coordinates is synchronous with scanning in the radial direction of each of the tapered plane and annular plane.

At the transformation of the coordinates, a minute height $\Delta h$ is plotted on the tapered plane in correspondence to the minute height $\Delta h$ on the rectangular coordinates, and the increase $\Delta s$ of the area of the tapered plane owing to this $\Delta h$ is expressed as follows:

$$\Delta s = \pi \left( r_1 \sqrt{r_1^2 + \left(\frac{r_1 \Delta h}{r_1 - r_0}\right)^2} - r_0 \sqrt{r_0^2 + \left(\frac{r_0 \Delta h}{r_1 - r_0}\right)^2} \right) \quad (1)$$

In the above formula, $r_1$ represents the radius of the marginal side of the tapered plane corresponding to the height, $\Delta h$, and supposing that the maximum radius of the tapered plane is $r_m$, $r_1$ is given by the following formula:

$$r_1 = r_0 + \Delta h \cdot \frac{r_m - r_0}{h} \quad (2)$$

Since the change of the area on the annular plane is set as being equal to the change $\Delta s$ of the area of the tapered plane, supposing that the radius at this point is $R_1$, the following relation is established:

$$\Delta s = \pi (R_1^2 - R_0^2) \quad (3)$$

and from this relation, it is understood that it is sufficient if the transformation of coordinates is performed so that the following relation is established:

$$R_1 = \sqrt{\frac{\Delta s}{\pi} + R_0^2} \quad (4)$$

At the second and subsequent transformations of coordinates, s is calculated by substituting $r_1(r_n)$ for $r_0(r_{n-1})$ and substituting $r_2(r_{n+1})$ corresponding to $2\Delta h[(n+1)\Delta h]$ for $r_1(r_n)$, and $R_2(R_{n+1})$ is calculated by substituting $R_1(R_n)$ for $R_0(R_{n-1})$.

The transformation of coordinates in the present invention can be applied not only to the case where the section of the tapered plane is a straight line as in the case of a frustoconical shape but also the case where the section of the tapered plane is a quadratic curve such as a circular arc, an elliptic arc, a parabola or a hyperbola. In the latter case, $R_n$ is calculated according to the following approximate equation:

$$\frac{1}{2} \times \Delta h \times \pi \{r(n\Delta h) + r((n-1)\Delta h)\} = (R_n^2 - R_{n-1}^2)\pi \quad (5)$$

and the transformation of coordinates is conducted from n=1 to n=h/$\Delta$h.

Figure 2:
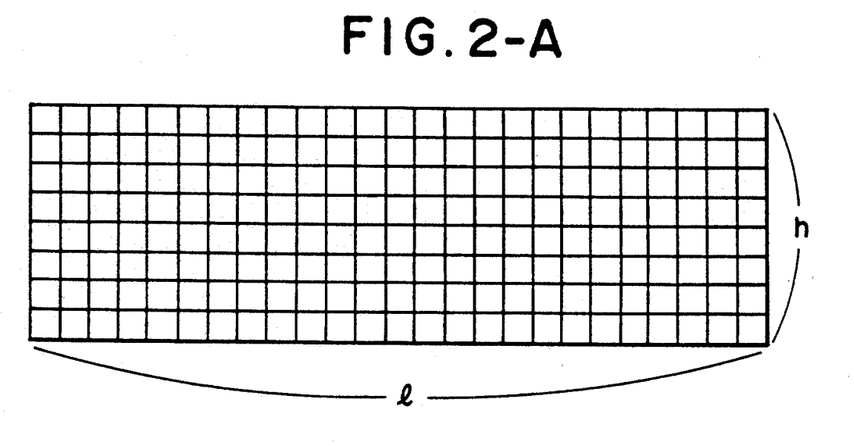
FIGS. 2A through 2C are diagrams illustrating the transformation of coordinates effected when the tapered plane is a frustoconical plane.

In the case where the tapered plane is a prismoidal plane, the transformation of coordinates can also be performed. In this case, the calculation of the above-mentioned equation is conducted based on the supposition that with respect to the rectangular coordinates, pytamoidal tapered plane and annular coordinates, with the change of the angle $\theta$ (that is, by scanning of the tapered plane and annular coordinates in the circumferential direction owing to scanning of the rectangular coordinates in the direction of axis X), r(nh) and $R_n$ are changed to define a rounded polygonal shape, as shown in FIGS. 2A, 2B and 2C.

The present invention will now be described in detail with reference to a preferred embodiment illustrated in the accompanying drawings.

Figure 3:
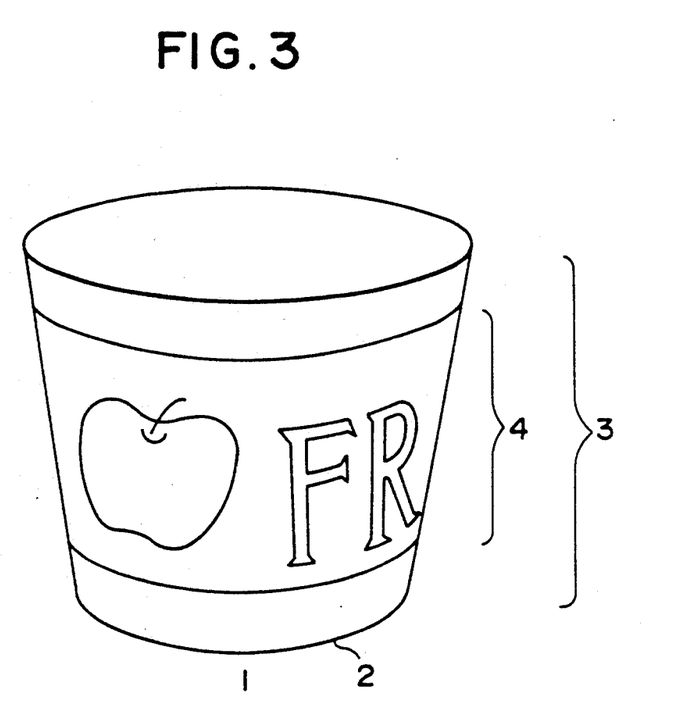
FIG. 3 is a perspective view illustrating a printed draw-formed body.
Figure 4:
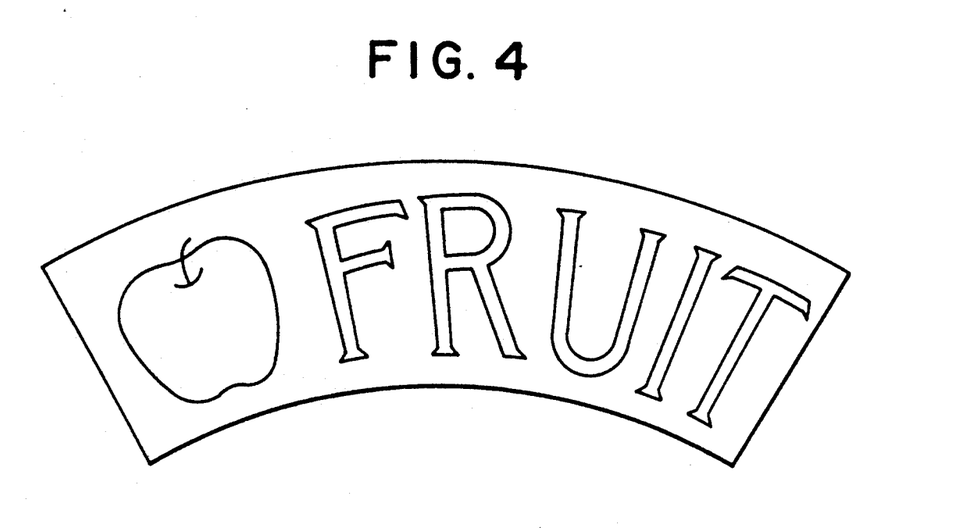
FIG. 4 is a diagram illustrating, in the developed state, the tapered side wall portion of the printed draw-formed body shown in FIG. 3.

Referring to FIG. 3 illustrating a printed draw-formed body, this printed draw-formed body 1 comprises a bottom 2 and a tapered circumferential side wall portion seamlessly integrated with the bottom 2, and a print layer 4 is formed on this tapered circumferential side wall portion 3. Referring to FIG. 4 illustrating the tapered circumferential side wall portion 3 in the developed state, the print layer 4 has a fan-like shape. According to the present invention, as shown in FIG. 5, the print layer 4 is formed on the entire surface of the tapered circumferential side wall portion 3 by the preliminary printing using a rectangular original 5 as shown in FIG. 5.

Figure 6:
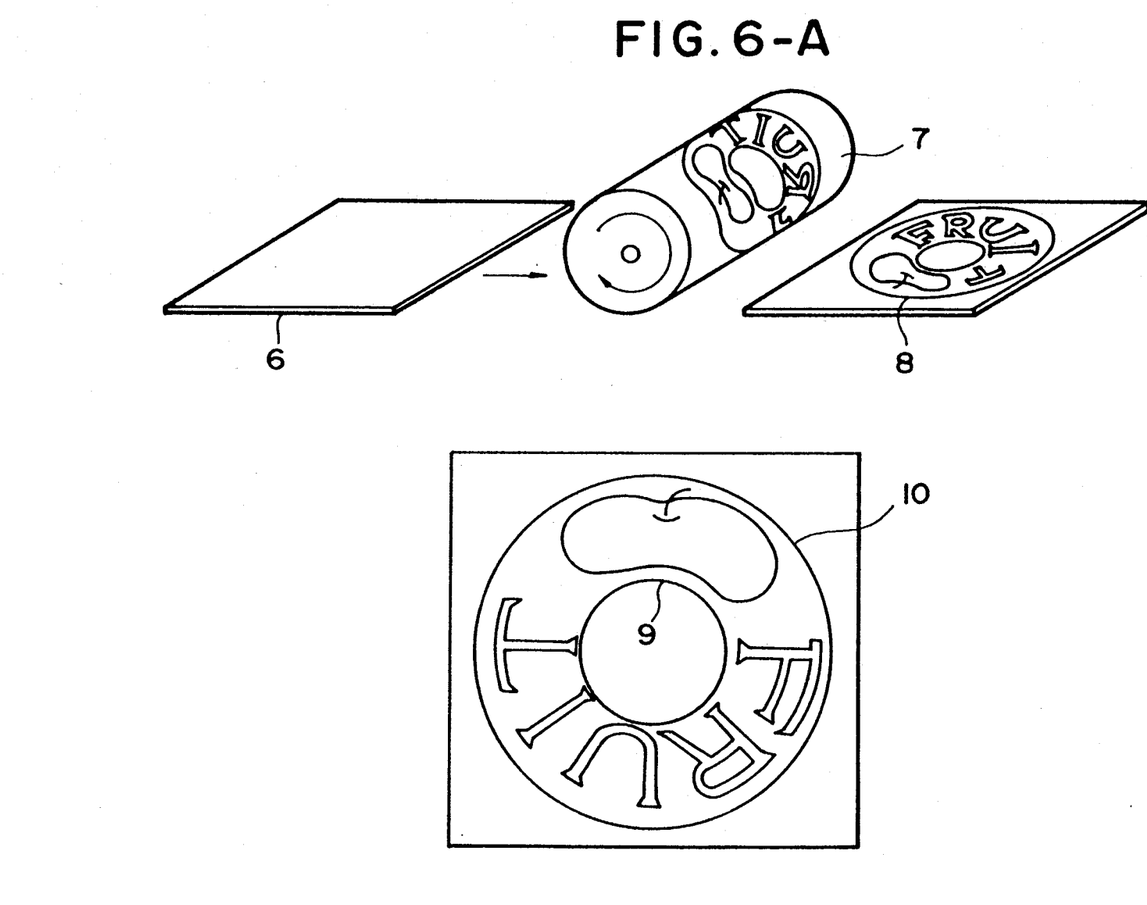
FIGS. 6A through 6C are diagrams illustrating the steps of preparing the printed draw-formed body shown in FIG. 3.

Referring to FIGS. 6A through 6C illustrating the steps of preparing a draw-formed printed body 1, at first, an annularly developed print layer 8 is applied to a flat metal blank 6 by using a printing plate 7 (FIG. 6A). This annular print layer 8 has an inner circumferential portion 9 almost equal to the length l of a rectangular original 5 and an outer circumferential portion 10 larger than the length l. The area of the annular print layer 8 is slightly larger than the area of the rectangular original 5.

The printed metal blank 6a is punched into a circular blank 13 by using a shearing die 11 and a shearing punch 12 at the shearing step shown in FIG. 6B. Then, at the draw-forming step shown in FIG. 6C, the circular blank 13 is gripped between a drawing die 14 having a diameter corresponding to the outer diameter of the formed body and a blank holder 15, and a drawing punch 16 having an outer diameter corresponding to the inner diameter of the formed body is pressed into the circular blank 13 to form a draw-formed body 1 shown in FIG. 3.

Figure 5:
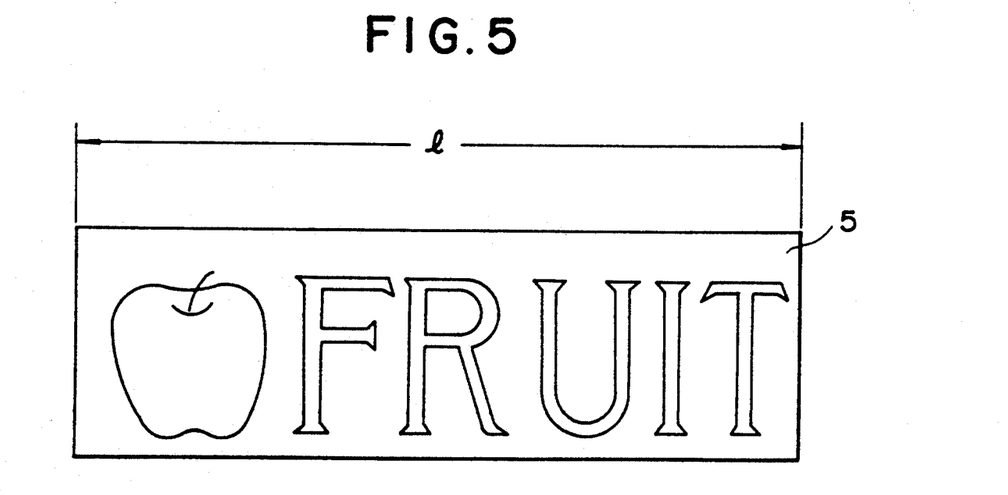
FIG. 5 is a diagram illustrating a rectangular original to be printed.

According to the present invention, a printing plate having an annularly developed printed image is made from a rectangular original as shown in FIG. 5 according to the digital image processing described in detail hereinafter.

Figure 7:
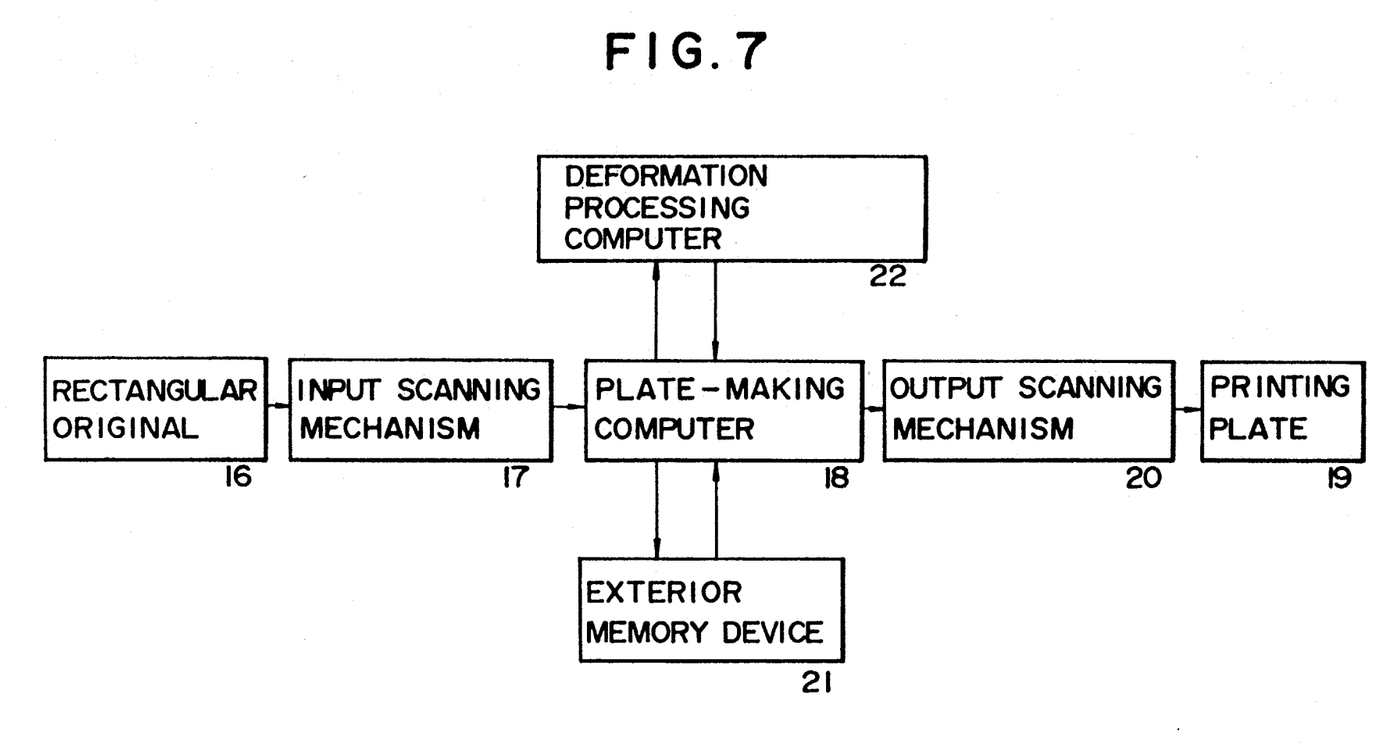
FIG. 7 is a block diagram illustrating the image processing step.

Referring to the block diagram of FIG. 7 illustrating the image processing treatment, the apparatus to be used this processing comprises, in general, an input scanning mechanism 17 for converting an image of a rectangular original 16 to an electric signal, a known plate-making computer 18 for performing analog/digital conversion of a picture element signal from the input scanning mechanism 17, inputting it as a digital picture element signal, performing, if necessary, editing operations such as correction, cutting, designation of the position, trimming and character composition, performing digital/analog conversion of the digital picture element signal and outputting the converted signal, an output scanning mechanism 20 for making a printing plate or block copy 14 based on an electric signal from the computer 18, a recording material 21 for storing data of the plate-making computer 18, and a deformation processing computer 22 for transforming the rectangular coordinates of the digital picture element signal from the plate-making computer 18 to annular coordinates having the same area as that of the rectangular coordinates and inputting the picture element signal on the transformed coordinates into the plate-making computer 18 again.

A known input mechanism of the cylindrical scanning or plane scanning system where an original is read line by line in the direction of the axis X (main scanning) and then, the original is read line by line in the direction of the axis Y (subsidiary scanning) can be used as the input scanning mechanism 17, and the reading scanning is carried out by detecting reflected light or transmitted light by a photomultiplier tube, a phototransistor or a charge coupling device. In general, a multi-color original is color-separated into cyan, magenta, yellow and black, and the input scanning is then carried out. Different numbers of scanning lines can be adopted for a pattern original and a letter original. A device of this type is ordinarily marked as a scanner and is easily available.

The plate-making computer 18 comprises a central processing unit (CPU) for receiving and analyzing input and output commands, working various programs and controlling input and output devices, a terminal equipment for issuing instructions to central processing unit (CPU), and a station for carrying out the image processing and editing, and the computer 18 further comprises a disk drive for use in storing systems and various files, and a magnetic tape device for reading the systems and saving and restoring the files. As a typical instance of the plate-making computer, there can be mentioned Response 300 Series marketed by Scitex, Israel. Furthermore, there can be used plate-making computers such as Studio 800 Series (Crosfield, Great Britain), Chromacom System (Rudolf Hell, Wet Germany), Pagematic System (Dai-Nippon Ink Kagaku Kogyo) and Sigmagraph System 2000 (Dai-Nippon Screen Seizo).

According to the present invention, by the deformation processing computer 22, as already explained with respect to FIGS. 1A through 1C, the rectangular coordinates are transformed to annular coordinates so that the height of the rectangular coordinates is made to correspond to the height of the tapered plane on which the printed image is to be manifested, and the change of the area of the tapered plane owing to a minute change of the height of the tapered plane is made equal to the change of the area of the annular plane.

For this transformation of coordinates, there is preferably adopted a method as disclosed in Japanese Examined Patent Publication No. 63-61658, in which the transformation of coordinates is carried out so that with respect to the annular plane, the number of picture elements is increased in the circumferential direction while the number of picture elements is decreased in the radial direction, and on increase of the number of picture elements, new coordinates of picture elements present in spaces between the transformed coordinates corresponding to adjacent picture elements of the rectangular coordinates are calculated.

Thus, picture element signals on the rectangular coordinates inputted in the plate-making computer 18 are substituted for the corresponding transformed coordinates and new coordinates, and the picture element signals on the transformed coordinates are read out in order of the coordinates and then outputted.

This operation is carried out according to the flow chart shown in FIG. 5 of Japanese Examined Patent Publication No. 63-61658, except the above-mentioned difference of the system of the transformation of coordinates.

The picture element signals on the transformed coordinates are supplied to the output scanning mechanism in order of the coordinates to make a printing plate or block copy. A known scanning recording system can be adopted as the output scanning mechanism 20. For example, there can be adopted various systems utilizing a silver salt photographing method, a dry silver recording method, an electrophotographic method, an electrostatic recording method, a negative or positive photoresist recording method, a photopolymer recording method, a diazo photographing method, a gelatin dichromate plate making method, an electrolytic recording method, a discharge breakdown recording method, an electric thermal recording method, a thermal recording method, a pressure recording method, an ink jet recording method or the like. As the scanning system, there can be adopted mechanical scanning systems such as a cylinder scanning system, a rotary disk scanning system, a helix cylinder scanning system, a belt type plane scanning system and a multi-needle plane scanning system, electron tube scanning systems such as a flying spot tube system, an optical fiber system and a multi-needle electrode tube system, and solid scanning systems such as a multi-needle electrode head system.

In the present invention, among these various recording systems, a laser recording system is preferably used for reading an original and making a printing plate, because this recording system is advantageous in that light energy can be concentrated on a micro-fine region of the wavelength order, light beams can be scanned over a broad region and on-off scanning can be performed at a high speed. He-Ne laser, Ar laser, He-Cd laser and the like can be used as the laser bean source.

In the present invention, the picture element density in the rectangular coordinates and final transformed coordinates can be changed over a broad region according to need, but it is general preferred that the picture element density be 12 to 100 dots/mm. In case of a pattern original, it is especially preferred that the picture element density be 12 to 14 dots/mm, and in case of a letter original, it is preferred that the picture element density be 36 to 100 dots/mm.

In the production of a printing plate for forming a multi-color image, cyan, magenta, yellow and black plates can be directly prepared by the output scanning mechanism 20. Furthermore, there can be adopted a method in which a negative print is once formed and a printing plate is prepared from this negative print by reverse printing.

As the blank to be preliminarily printed, there can be mentioned optional blanks to be used for the draw-forming operation, such as plates and foils of light metals such as aluminium surface-treated steels such as tinplate and TFS. Moreover, these plates coated with organic resin paints or laminated with plastics such as polyethylene, polypropylene and polyesters can be used.

As is apparent from the foregoing description, according to the present invention, in preliminarily printing a blank for a tapered draw-formed body, by transforming digital rectangular coordinates to annular coordinates so that the height of the rectangular coordinates is made to correspond to the height of a tapered plane on which the printed image is to be manifested and the change of the area of the tapered plane by a minute change of the height of the tapered plane is made equal to the change of the area of the annular plane, excessive flattening of the image in the lateral direction is prevented when the resulting preliminarily printed blank is draw-formed, and an image having a beautiful appearance and a high commercial value can be reproduced.

We claim:

1. A method for preliminarily printing a blank for a tapered draw-formed body, which comprises converting an image on an original to be printed, to a picture element signal on digital rectangular coordinates corresponding to picture elements, transforming the rectangular coordinates to annular coordinates so that he height of the rectangular coordinates is made to correspond to the height of a tapered plane on which the printed image is to be manifested and the change of the area of the tapered plane by a minute change of the height of the tapered plane is made equal to the change of the area of the annular plane, photoelectrically making a printing plate based on picture element signals on the transformed coordinates, and printing the blank by using the obtained printing plate, wherein the transformation of the rectangular coordinates to annular coordinates is carried out so that the following relation is established:

$$R_1 = \sqrt{\frac{\Delta s}{\pi} + R_0^2}$$

wherein $R_0$ is a standard radius int he annular coordinates, $\Delta S$ is an increase of the area of the tapered plane due to a minute change of the height of the tapered plane, and $R_1$ is a radius in the annular coordinates when the area of the tapered plan is increased by $\Delta S$.

2. A method according to claim 1, wherein reading of the original and formation of the printing plate are carried out according to the laser recording method.

3. A method according to claim 1, wherein the picture element density in the rectangular coordinates and final transformed coordinates is int he range of from 12 to 100 dots/mm.

4. A method according to claim 3, wherein the original is a pattern original and the picture element density is 12 to 14 dots/mm.

5. A method process according to claim 3, wherein the original is a letter original and the picture element density is 36 to 100 dots/mm.

* * * * *